Figure 1:
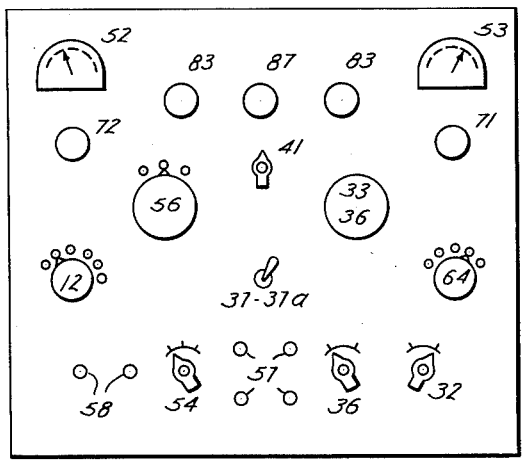

Oct. 2, 1962   M. J. EDWARDS   3,056,409
METHOD OF AND MEANS FOR PHYSIOTHERAPY
Filed Aug. 28, 1953   3 Sheets-Sheet 1

Meryl J. Edwards
INVENTOR.

BY James F. Weiler
ATTORNEY

Oct. 2, 1962  M. J. EDWARDS  3,056,409
METHOD OF AND MEANS FOR PHYSIOTHERAPY
Filed Aug. 28, 1953  3 Sheets-Sheet 3

Meryl J. Edwards
INVENTOR.

BY James F. Weiler
ATTORNEY

United States Patent Office 3,056,409
Patented Oct. 2, 1962

3,056,409
METHOD OF AND MEANS FOR PHYSIOTHERAPY
Meryl J. Edwards, 3515 Velva, Shreveport, La.
Filed Aug. 28, 1953, Ser. No. 377,191
37 Claims. (Cl. 128—422)

The present invention relates to a method of and means for physiotherapy and, more particularly, to such a method and apparatus in which beneficial results may be obtained without the use of painful voltage treatments.

Therapy equipment in use at the present is quite painful to persons being subjected to therapy treatment. This equipment or machines produce, in general, sinusoidal or square waves, principally for their tetanizing currents. As used herein, a tetanizing current is an alternating current which flows for a short period of time in one direction, then in the opposite direction for an equal period of time, and is used generally for creating relaxation through fatigue. The sine wave produced by these machines has a peak voltage above its root mean square which has no therapeutic work value, but simply adds to the pain of treatment. The production of the square wave constituted an improvement over the sine wave due to the fact that it cuts off at the root mean square value but it is still dependent upon voltage for its tetanizing current. In difficult therapy cases the patient is in a considerable amount of pain once sufficient power (voltage) is applied to create a tetanus in a muscle. This tetanizing current is the principal factor in therapy equipment and machines presently in use.

Standard therapy equipment now on the market nearly all use from about 1000 to about 2000 cycles per second, which are good tetanizing frequencies, but aside from being painful these tetanizing frequencies are not always practical in neurovascular treatments or other treatments which require reactivation of the nervous tissue at a minimum voltage.

The waves generated by the central nervous system of man, as seen on the electroencephalogram and oscilloscope, are varied frequencies depending on the function which they are supposed to perform. For example, the lower frequencies are most commonly found emanating from the parietal regions which control the voluntary muscles and viscera. The fundamental frequency of the two highest frequencies are those most commonly found in the occipital region and the harmonics thereof are found in the frontal region. Thus, in general, the wave form of human beings, as viewed by the electroencephalogram and oscilloscope, is a composite consisting of waves of many frequencies with shifting phase relationships and varying amplitudes due to the different areas from which they emanate or to which they are transmitted for different purposes.

The present invention comprises the production of wave forms which are a combination of square waves rich in harmonics with their work voltage peak stretched and further modulated by a vibrating low frequency which, in general, gives the appearance of two stretched waves combined with a series of fast waves constantly varying as to shape and amplitude, which generally simulate and approach the shapes of the various brain waves. This wave form is impressed with little or no voltage on the membrane surrounding the nerves, thus activating the nerves, causing contractions of enervated skeletal muscles with physiological safety without the use of painful voltage treatments. In ordinary treatment, the equipment or machines producing this wave form will give no indicated voltage on the volt meter and rarely over 2 to 5 volts is necessary although the American Medical Association specifies to 250 volts in standard equipment now being used for physiotherapy treatment.

It is, therefore, a major object of the present invention to provide a means for producing wave forms generally simulating wave forms produced by the central nervous system of human beings, as seen on the electroencephalogram and oscilloscope, which may be impressed on the membrane surrounding the nerves, thus activating the nerves and causing contraction of skeletal muscles, the area of trauma, aiding in the restoration of function and relief of pain.

It is yet a further and major object of the present invention to provide a method of physiotherapy in which simulated wave forms of the central nervous system of human beings are impressed upon the membrane surrounding the nerves for activating the nerves without the use of painful voltage.

It is yet a further object of the present invention to provide an apparatus which will produce a variety of wave forms generally simulating the wave forms of the central nervous system of human beings, as viewed on the electroencephalogram and oscilloscope, which may be impressed on the membrane surrounding the nerves for treatment of a wide variety of ailments.

It is yet a further object of the present invention to provide an apparatus which produces wave forms which effectively activate nervous tissue without the use of painful voltage.

It is yet a further major object of the present invention to provide a method of physiotherapy in which simulated wave forms of the central nervous system of human beings are impressed upon the membrane of sensory nerves for the purpose of stimulating reflex arcs through the central nervous system, and for the further purpose of aiding in the recovery of the loss of bodily sensations arising from dysfunction of both peripheral nerves, and of sensory areas within the central nervous system.

Figure 2:
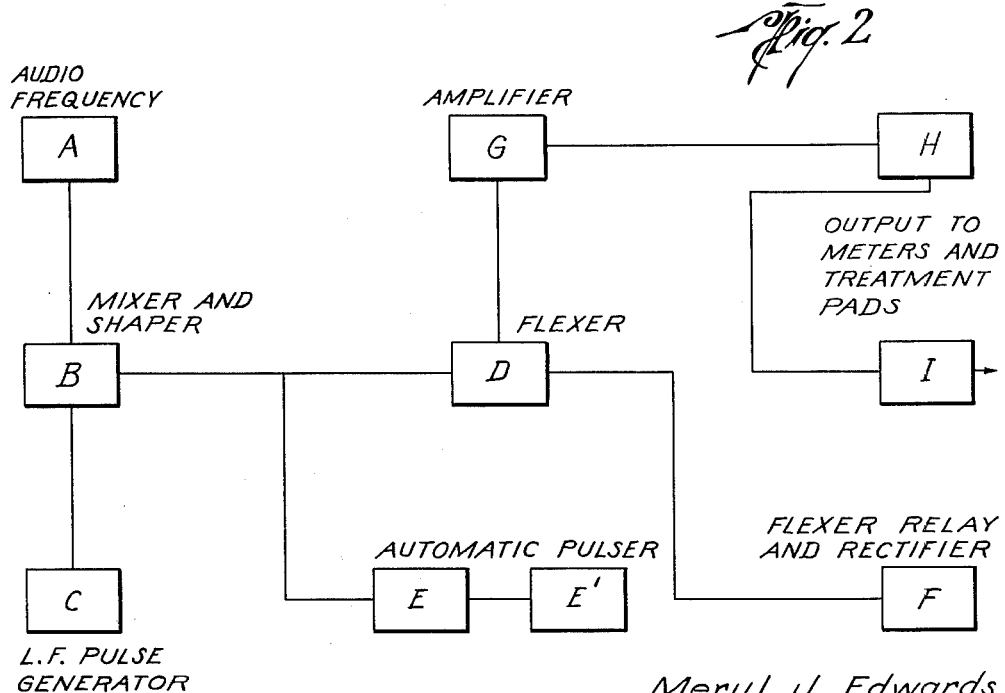
Figure 3:
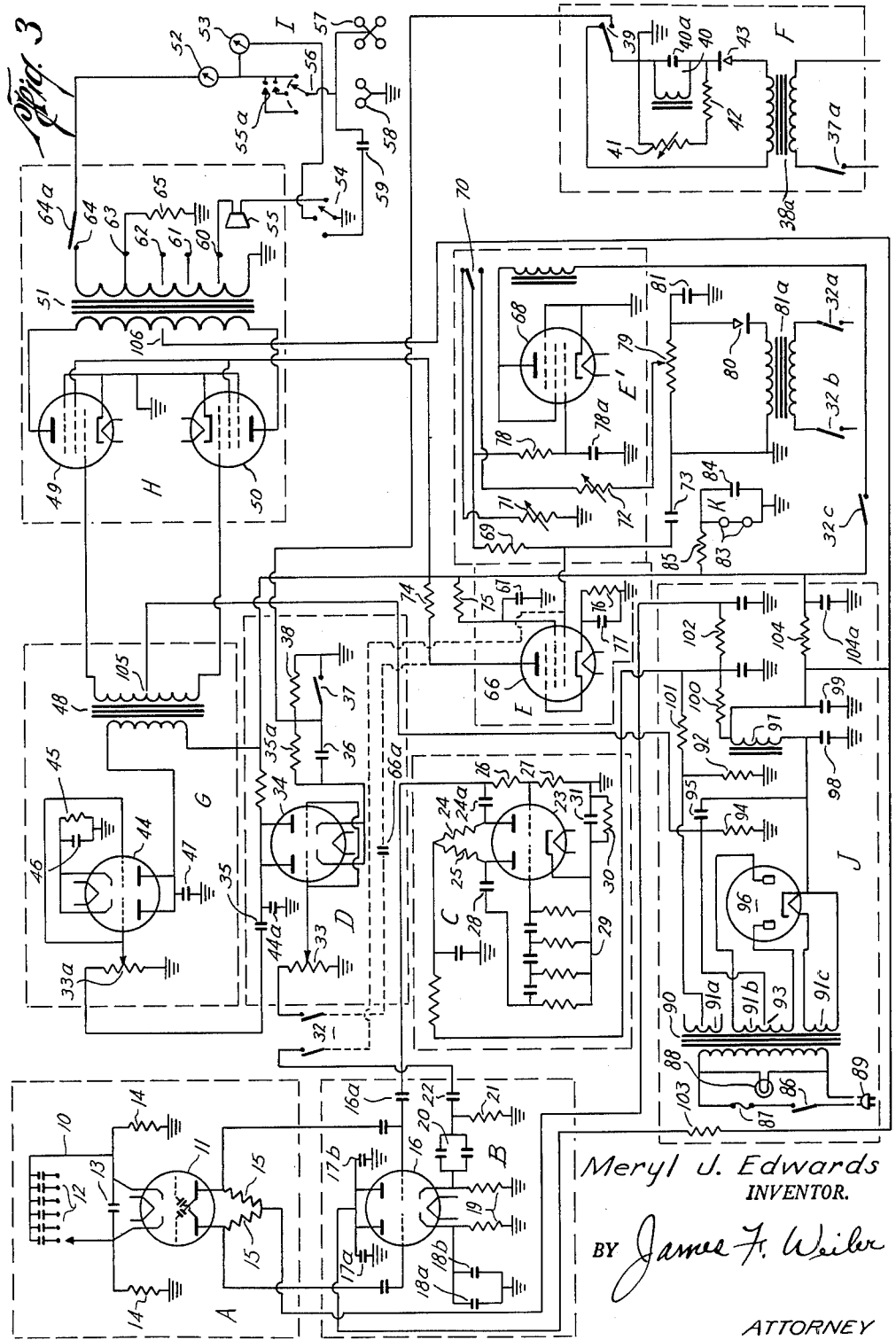

Other and further objects and advantages and features will be apparent from the following description of examples of the invention given for the purpose of disclosure, and taken in connection with the accompanying drawings, where like character references designate like parts throughout the several views, and where FIGURE 1 is a front elevation of a panel of an apparatus constructed according to the invention, FIGURE 2 is a diagrammatic illustration of a circuit constructed and arranged according to the invention, FIGURE 3 is an electrical circuit diagram which produces wave forms according to the invention, and FIGURES 4–9 are typical wave forms produced by the apparatus of FIGS. 2 and 3, as viewed on the oscilloscope, during a period of about one fiftieth of a second.

In general, an apparatus satisfactory for producing the wave forms of the present invention comprises means to generate an audio-frequency having a square wave form, which, when seen on the oscilloscope, has the appearance of several waves due to their harmonics. These waves are stretched beyond the normal width of square waves, and this may be accomplished by eliminating the grid resistors. These waves are then fed to a modulator system or mixer circuit of the cathode-follower type where they are modulated at the grid by amplitude-pulsed, alpha-beta waves produced by a relaxation oscillator or alpha-beta oscillator system. Preferably, the amplitude-pulsed, alpha-beta waves should also contain multiple harmonics. (The use herein of alpha-beta is the same as in electroencephalography rather than in radiology and defines a frequency range of about 9 to about 26 cycles per second.) The modulated wave is then brought out of the cathode circuit through a means to change it from low to high impedance, such as an R.C. bridge including a low cathode resistance, coupled through low-impedance high-capacity coupling condensers, into a high resistance, followed by a high impedance low capacity coupling condenser, where the complete composite wave form generally simulating the wave forms of the central nervous system of human beings appears. The composite wave form is then refined and amplified and applied in a manner mentioned later to the person undergoing treatment.

The apparatus of the present invention may better be understood by reference to FIG. 2 of the drawings which illustrates the generator A which produces a square wave rich in harmonics and in the audio range, and which wave is stretched beyond the normal width of square waves. A square wave stretched beyond the normal width of square waves means that the R.C. constant (both input and output) is selected to give the longest possible flat top and the steepest possible sides to the wave in order to get the greatest possible amount of usable work voltage or energy from each cycle. Thus, there is a horizontal lengthening of the peak of a pulse beyond its normal time constant, and for the present purpose reslopes the square wave into more of a rectangular wave with its greatest length being on its horizontal axis rather than the vertical, in order to obtain a more useful work period per cycle. For other definitions of wave or pulse stretching, reference is made to the January 1946 issue of Electronics Magazine, page 146, published by McGraw-Hill Publishing Co. and Industrial Electronic Circuits, page 127, published by McGraw-Hill Publishing Co. This square wave is fed to the mixer and shaper B where it is modulated by the relaxation or L.F. pulse oscillator C. The amplitude-pulsed wave produced by the relaxation oscillator C is also rich in and contains multiple harmonics. The modulated wave passes to the flexer D where sudden, painless but violent contractions may be caused when needed, or where the modulated wave may be automatically and gradually pulsed or surged by the automatic pulser E and E¹. The term "flexer" or "flexer circuit" as used herein means a circuit which bends a joint and differentiates between the flexor muscle, which bends a joint, and the circuit which causes the flexor muscle to flex the joint. The flexer circuit D is used for providing instantaneous full and no amplification generally to release muscular tension surrounding joints and other areas, and the pulser or surge circuit E and E¹ is for a mild clonic exercise of a muscle. If desired, the modulated wave may be surged manually or by the automatic pulser circuit E and E¹. The modulated wave may then be passed to the amplifier circuit G and then to the output meters and treatment pads H and I, respectively. The output circuit may include means to filter and rectify the pulse-modulated wave to produce galvanic current, and may include means to rectify the pulse-modulated wave without filtering to provide faradic current, as will be apparent later.

Thus, a square wave in the audio-frequency range, stretched in width beyond the normal width of a square wave is fed to a mixer circuit or modulator system where it is modulated at grid by an amplitude-pulsed wave containing multiple harmonics produced by a relaxation oscillator or alpha-beta oscillator system. The modulated-pulsed wave is brought out of the cathode circuit and changed from a low to a high impedance, where the complete composite wave appears. Thus the wave is taken from the output of a low impedance circuit, the cathode resistance (about 200 ohms) of tube 16, and is coupled through low impedance coupling capacitor 20, composed of a high capacity electrolytic capacitor, paralleled by low capacity electrostatic capacitor, into a high impedance circuit composed of a high resistance resistor 21, and a low capacitance capacitor 22, which looks into a higher resistance resistor 33 and the grid of the tube 34. The wave is then refined and amplified and passed to suitable meters or indicating means and treatment pads for application to the patient. It is necessary to refine the wave in order to make it usable as a treatment wave which simulates the wave generated by the central nervous system inasmuch as the wave has just been coupled into a high impedance circuit, so further processing by means of circuitry design with circuit constants, voltages and certain peculiarities is necessary in order to obtain the exact type of wave form desired in the output circuit. If desired, the wave may be rectified and filtered to provide a galvanic current, rectified to provide faradic current, and all these currents may be automatically or manually surged for treatment purposes.

Referring now to the circuit diagram of FIG. 3, a satisfactory apparatus is provided for obtaining and producing wave forms generally simulating the various wave forms, as viewed on the electroencephalograph, produced and transmitted by the central nervous system of human beings. Throughout the description, certain values are indicated in connection with certain elements, which values are illustrative and are satisfactory. Referring to this figure, the apparatus included within the dash-line rectangle A include a single-pole six-throw switch 12 connected to the square wave generator 11. The switch 12, preferably, has a range of frequencies of approximately 200 c.p.s., 400 c.p.s., 750 c.p.s., 1250 c.p.s., 2250 c.p.s. and 4000 c.p.s., although other frequencies may be used. The condensers 10 may be of any conventional type; however, it has been found at present that ceramic condensers obtain a better group of harmonics for the present purposes than mica, although mica or tubular condensers are satisfactory. In providing the frequencies mentioned, 0.5, 0.25, 0.15, 0.07, 0.03 and .015 microfarad are satisfactory.

The condenser 13, which may be of the order of 0.01 mfd., connected across the switch 12 and to the cathodes of the electron tube 11 stabilizes the oscillator 11 and the cathodes are connected to ground through the resistors 14 which are high-resistance cathode resistors, which may be of the order of about 100,000 ohms, the function of which is to control the grid potential without grid bias resistors. Thus, the grids of the electron tube 11 never become negative, but become less positive with respect to the plates or anodes.

The plates of the electron tube 11 are coupled to the grids by the coupling condensers, which may be about .005 mfd., and the plates are supplied anode potential from the power source enclosed in the dash-line rectangle J through the plate resistors 15, which may be of any low resistance, say 2200 ohms, but both alike, the function of which is to provide low-plate load resistance for a more stable circuit. The electron tube 11 may be any two triodes or a duo or twin triode, as illustrated, with an amplification factor of from about 70 to about 100.

It is noted that the electron tube 11 has the usual grid resistors omitted, which functions to stretch the square waves normally produced thereby beyond their normal width, which is desirable for the present purpose. The square waves emanating from the electron tube 11 are fed into the mixer within the dash line rectangle B, which functions as a mixer modulator and shaper which comprises the duo or twin triode tube 16. In place of the duo triode tube 16, any two triode tubes having the same gain factors may be used. The electron tube 16 is of the cathode-follower type and the waves fed to the mixer circuit or modulator system B from the plate circuit of the generator 11 are modulated at the grids of the electron tube 16 by an amplitude-pulsed wave produced by the relaxation or alpha-beta oscillator, included within the dash-line rectangle C. The plates of the duo triode 16 may be coupled to ground through the low-frequency bypass condenser 17a, say about 10 mfd., and high-frequency bypass condenser 17b, about .01 mfd., when anode potential is supplied from the power supply J.

To prevent spurious feedback and to provide circuit balance in twin triode electron tube 16, and to further aid in balancing the circuit of the square-wave generator circuit A by reflected impedance, one of the cathodes thereof is coupled to ground through low resistance 19

(say of the order of 200 ohms flexible), in parallel with high and low capacity condensers 18 and 18b, which may be of the order of 25 mfd. (tubular electrolytic) and 0.01 mfd. (electrostatic tubular), respectively. The second cathode of electron tube 16 provides cathode coupling of the modulated wave through a low to high impedance bridge composed of low resistor 19 (of the order of 200 ohms) to ground, low and high capacity condensers 20 in parallel to the juncture of high resistance 21 to ground and low capacity condenser 22 to switch 32. As will be apparent later, it is at this point where the modulated wave changes from a low to a high impedance and where the desired wave form first takes shape. By way of example, low and high capacity condensers 20 may be of the order of 25 mfd. and .01 mfd., respectively, high resistance 21 may be about .1 megohm, and the low capacity condenser 22 of the order 0.1 mfd.

The circuit enclosed within the dash line rectangle C is a pulse generator circuit which is triggered by the circuit from the mixer B and which is fed back into the grid of the electron tube 16 to modulate the wave from the square-wave generator 11. The wave from the pulse circuit is of a lower frequency than that of the generator A and may be of the order of about 9 to 26 cycles per second, which is an alpha-beta wave range in electroencephalography as distinguished from radiology.

The amplitude pulsed modulator circuit in the dash-line rectangle C varies the amplitude of the waves rapidly and functions to flex an entire muscle or organ at a slow rate of speed whereas the high speed generator circuit A functions to flex individual cells at high rates of speed. The pulser circuit C includes the duo or twin triode 23, although a pair of triodes may be used, the plates of which are supplied anode potential from the power circuit J through the fixed resistors 24 and 25, which may be of the order of 0.1 and 0.47 megohm, respectively. One of the anodes is coupled by the coupling condenser 16a to the mixer grid of electron tube 16 through low capacity ceramic condenser 24a in series therewith. This same anode is also coupled to its own grid through condenser 24a in series with isolation and bias resistors 26 and 27, and the other anode is coupled through the condenser 28 to the R.C. network 29. The order of 25 mfd. and .01 mfd. coupling condensers 20, and 0.1 mfd. coupling condenser 22 is satisfactory. The cathode of tube 23 is coupled to ground through fixed resistor 30 shunted by the condenser 31, which adjusts the speed of the oscillator and regulates the point at which the circuit begins to function. As indicated before, the modulated wave changes from a low to a high impedance at the condenser 22 and the wave is fed through the double pole, double throw switch 32 to the flexer circuit within the dash-line rectangle D so that, if desired, the waves may be automatically or manually surged. Satisfactory results are obtained by using a 12,000 ohm resistor 30 and a 20 mfd. condenser 31.

The output of modulator B is coupled to the potentiometer 33 through the poles of the double-acting, four-pole two-throw switch 32, the slider of the potentiometer being connected to a grid of the duo or twin triode 34 of the flexer circuit D. The function of the potentiometer 33 is to adjust the effective amplification of the tube 34. Thus, the output of tube 16 is coupled to the input of tube 34 through the coupling condensers 20, the coupling condenser 22, the switch 32 and the potentiometer 33. The order of 25 mfd. and .01 mfd. coupling condensers 20, and 0.1 mfd. coupling condenser 22 is satisfactory.

The plates of the twin triode 34 are coupled through the coupling condenser 35 to the potentiometer 33a, which is on a common shaft (not shown) with potentiometer 33, the slider of which is connected to a grid of the amplifier tube 44 included within the dash-line rectangle G. The function of the amplifier circuit G is to amplify the pulse-modulated wave, whether surged or not, and to feed it to the input transformer 48 of the push-pull amplifier H. Satisfactory results have been obtained by utilizing 0.5 megohm potentiometers and 0.1 mfd. coupling condenser 35.

Referring again to the flexer tube 34, this may be either of the dual or single-triode type, the cathodes of which are coupled to the automatic grounding device within the dash-line rectangle F through the fixed resistor 35a, which may be about 680 ohm, and shunted by the condenser 36, which may be about 0.1 mfd. The cathodes of tube 34 are also coupled to ground through the switch 37 and the fixed resistor 38 of about 12,000 ohms. The switch 37 is a portion of a double pole, double throw switch 37A of the automatic grounding device F.

The automatic grounding device F includes make and break apparatus and functions to control the amplification of the tube 34 through opening switch 37A when switch 37 is closed and vice versa. Any suitable make and break arrangement may be utilized, including suitable mechanical arrangements; however, the arrangement illustrated is satisfactory and advantageous in that only one moving part and no motors are necessary. The switch 37A is connected to the primary of the transformer 38a, such as a Stancor P 6134, the secondary of which is coupled to the make and break elements 39 and relay 40. The speed of the make and break is controlled by the variable resistance 41 and the fixed resistance 42 of the relay 40 and capacity of condenser 40a in parallel with relay 40. The secondary of the transformer 38a is coupled through the rectifier 43 to the relay 40 and its parallel condenser 40a. Thus, the amplification of the tube 34 is controlled manually by the potentiometer 33 and by the automatic make and break circuit F. The flexed or pulsed wave from the tube 34 is fed to the potentiometer 33a through the coupling condenser 35, as mentioned, and is coupled to ground through the bypass condenser 44a, which may be of the order of .001 mfd., the function of which is to prevent oscillation in the tube 34.

As mentioned, the circuit apparatus in the dash line rectangle G comprises an electron amplifier which includes the dual or twin triode 44, the grid of which is connected to the slider of the potentiometer 33a, the cathodes of which are coupled to ground through the fixed resistance 45 shunted by the condenser 46, which may be 20 mfd. and 1000 ohms, respectively. The plates or anodes of the tube 44 are coupled through the bypass condenser 47, which may be of the order of 0.005 mfd., to ground and to the primary of the input transformer 48 of the push-pull amplifier H. The transformer 48 may be of the 3 to 1 step-up type, such as a Stancor A–73–C, the secondary of which is tapped to the grids of the push and pull amplifier tubes 49 and 50. These last-mentioned tubes may be beam pentodes, the function of which is to convert voltage into power. The plates of the pentodes 49 and 50 are connected to the primary of the transformer 51, the secondary of which may be tapped at impedances of 4, 8, 16, 250 and 500 ohms, at 60, 61, 62 and 63, respectively. The secondary of the transformer 51 is coupled to ground and to the milliammeter 52 through the switch 64a. The milliammeter may be of any suitable type, and preferably be in the 0 to 50 or 0 to 100 milliampere range. From the milliammeter the output is fed, paralleled by volt meter 53, through the single-pole triple-throw switch 56 to output jacks 57 when faradic or tetanizing currents are in use. The switch 54 in the right-hand and left-hand position disconnects the volt meter and connects the speaker monitor 55, or condenser 59, which preferably is a 2 mfd. paper condenser, to ground, respectively. Thus, the volt meter is out of the circuit when galvanic current or the audio speaker 55 is in use. The switch 56 is a single-pole, three-throw switch connecting either through the diode rectifiers 55a, preferably germanium, positioned for either positive or negative operation with respect to jacks 57, or fed straight through as unrectified tetanizing current to the four jacks 57 in parallel, which jacks may conveniently be referred to as active. The two jacks 58 are connected to ground and may be referred to as the indifferent jacks.

When galvanic current is being supplied to the jacks 57, this is smoothed by filter condenser 59, preferably a 2 mfd. paper condenser, and the galvanic current is developed by rectifying and filtering the audio frequency. The faradic current is developed by rectification of the same audio frequency without filtering through the filter 59.

As indicated before, the secondary of the transformer 51 is tapped at impedances of 4 ohms at 60, 8 ohms at 61, 16 ohms at 62, 250 ohms at 63 and 500 ohms at 64 with the 250 ohms tap coupled to ground through the fixed resistor 65. A satisfactory resistor is a 500 ohm, 50 watt resistor which provides a 25 watt safety load resistance.

Thus, in the operation of switch 56, beginning at the left-hand side and moving in a clockwise direction, in the first position, negative galvanic or faradic current is fed to the jacks 57, in the central position positive galvanic or faradic current is fed to the jacks 57, and in the extreme right-hand position only tetanizing current is fed to these jacks. In connection with switch 54, beginning at the left and moving clockwise, in the first position, galvanic current is supplied inasmuch as the audio is filter by the filter 59 and rectified at 55a, in the middle or second position, the volt meter is connected and either faradic or tetanizing current is fed to the jacks 57, and in the far right position, the volt meter 53 is disconnected and the monitor speaker 55 is connected, the purpose of which is for audible adjustment of the treatment circuits by blind physicians or therapists.

It is appreciated, of course, that any desirable arrangement of filter networks, indicators and rectifiers may be used; however, the arrangement illustrated is satisfactory.

When it is desired to provide automatic surging, the switch 32 is closed to cut in the automatic surging circuit E which is coupled by the coupling condenser 66a and which includes the pentode 66, the cathode of which is coupled to ground by a cathode biasing network consisting of the fixed resistor 76, shunted by the condenser 77, which may be of the order of 1000 ohms and 25 mfd., respectively. The screen grid of the tube 66 is coupled to ground through the bypass filter 67, which may be of the order of 10 mfd., 450 volts, and the control grid thereof is coupled to the control grid of the relay actuating pentode 68 through the grid isolation resistor 69, time relay 70 and the fixed resistor 78. The control grid of the pentode 68 is coupled to ground through the condenser 78a, the function of which is to filter the audio frequency from tube 68 to prevent chatter. The control grid of tube 68 is also coupled to ground through the relay switch 70 and the variable resistor 71, the function of which is to control the rate of rise of the amplification of tube 68. The control grid of tube 68 is also coupled through the relay switch 70 and the variable resistor 72 to the slider of the potentiometer 79, the function of the resistor 72 being to control and regulate the rate of amplification of tube 68. Thus, the variable resistors 71 and 72 regulate the fall and rise, respectively, of amplification of tube 68 by controlling the speed of charge and discharge of condenser 73. Satisfactory results have been obtained by using a 10 mfd. resistor 78, a .47 megohm resistor 69, a 20 mfd. condenser 78a, a 2 megohm variable resistor 71 a 5 megohm variable resistor 72, and a 10,000 ohm, 10–25 watt tapped resistor, potentiometer 79, although other values may be used.

The pentode 68 is controlled by the same circuit constants as the pentode 66, except that the former is a relay-actuating tube and serves as a timer for timing the amplification rise and fall of the pulsing tube 66.

While the arrangement just described is satisfactory, the timing of the amplification rise and fall of the pentode 66 may be performed mechanically, such as by rotating a potentiometer in either the cathode or grid circuit of the pentode 66. The arrangement illustrated is preferred, however, because it is more sensitive and easier to control, and at the same time is less bulky.

The variable resistance 72 provides a complete surge from about 5 cycles per minute to about 170 cycles per minute and the plate of the pentode 66 is coupled through the plate load resistor 74 to the screen grids of the push-pull pentodes 49 and 50. Voltage is supplied through the screen-grid, voltage-dropping resistor 75 connected to the screen grid of the pentode 66, and the resistance 78 coupled to the control grid of the relay-actuating tube 68 functions to isolate the automatic pulser tube 66 from the relay-actuating tube 68. Satisfactory results are obtained by using a 5 megohm variable resistor 72, a 0.1 megohm resistor 74, a 0.5 megohm resistor 75 and a .47 megohm resistor 78.

As mentioned before, the control grid of the relay-actuating tube 68 is coupled through the resistance 78, relay 70, variable resistance 72 and the variable potentiometer 79 through the rectifier 80 to the secondary of the transformer 81a, the resistor of the potentiometer being coupled to ground through the direct current filter 81, and by direct ground connection on the opposite end. The function of the potentiometer 79 is to set the voltage applied to the timing condenser 73, preferably a 2 mfd. oil-filled paper condenser, coupling the control grid of the pentode 66 to ground. Preferably, the potentiometer 79 is a fixed resistor with a sliding tap as illustrated. The switch elements 32A, 32B and 32C are all parts of the four-pole, double-throw switch 32 for providing automatic surging when this circuit is cut in. Satisfactory results are obtained by using an NC 5 selenium rectifier 80 and a filament transformer 81a, such as a Stancor P6134.

The apparatus in the dash-line rectangle J illustrates a satisfactory power circuit which includes the rotary switch 86, the fuse 87, arranged with the neon panel light 88 in parallel with the primary of transformer 90 to indicate that the power is on. The switch 86 is connected to the plug-in or A.C. cap 89, which is connected to the primary of the transformer 90, the secondary 91A which is coupled through a tap in the bleeder resistors 92 and 101 (which may have resistances of .1 and .27 megohm, respectively) to ground to provide constant direct voltage current, say of the order of 100 volts, potential on the filaments in the oscillator circuits to prevent filament to cathode shorts therein. The transformer 90 may be a Merit P3153, although others may be used. 91B indicates a high voltage secondary which is center tapped at 93 to the center tap of input transformer 48 of the push-pull amplifier H, and the negative side of the filter condenser or capacitor 95, and coupled through the high side of resistor 94 to ground, for the purpose of providing a fixed bias voltage, say of the order of 25 volts, to the grids of the push-pull tubes 49 and 50.

The secondary 91C of the transformer 90 is coupled to the cathode of the rectifier tube 96 which preferably is of the slow-heating type to eliminate any surge and to act as an electronic starter for the tube 11, circuit A. The secondary 91B is also center tapped at 93 to the high-side of resistor 94. The cathode of rectifier tube 96 is also connected through a choke 97, such as a 110 mil rating, which is filtered out on each side to ground, as at 98 and 99, through the fixed resistor 100 which feeds the bleeder 101 and plate circuit of the tube-modulation oscillator 23. Condensers 98 and 99 may have capacities of 10 mfd. and a 5000 ohm-25 watt resistor 100 is satisfactory. Anode potential is also fed through the fixed resistor 102 to the plate circuit of the high frequency oscillator tube 11 through the fixed resistors 15. Additionally, anode potential is supplied to the plate circuit of the mixing tube 16 through the fixed resistor 103 and to the plate circuit of the relay-actuating tube 68 through the fixed resistor 104. The resistors 102, 103 and 104, preferably, have the same capacity as that of resistor 100. As mentioned before, potential is supplied to the primary of the input transformer 48 at 105 and the primary of the output transformer 51 at 106 and through the filter resistor 104, shunted to ground by a filter condenser 104a (which may have a capacity of 10 mfd.) to the time relay 70 and the plate circuit of the relay tube 68.

Thus, the power circuit supplies power to the various elements of the apparatus, and while a detailed and specific description of a satisfactory power circuit has been given, it will be understood that any suitable power circuit may be utilized. The apparatus develops energies with wave forms which closely approximate those produced by the central nervous system of human beings, as, for instance, those recorded in electroencephalography.

Figure 4:
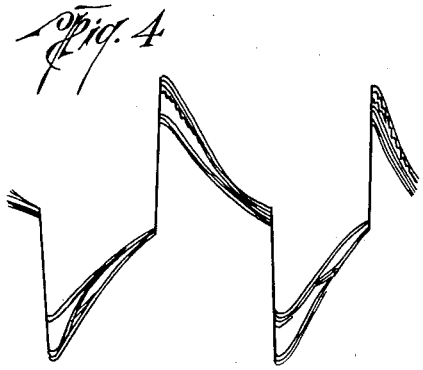
Figure 7:
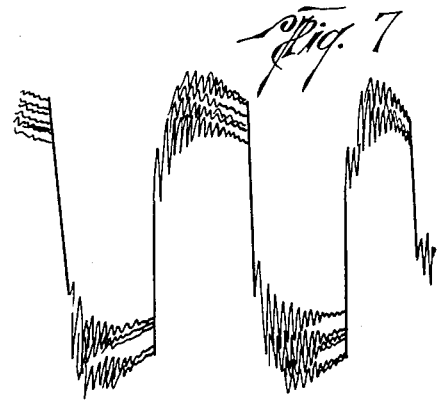
Figure 5:
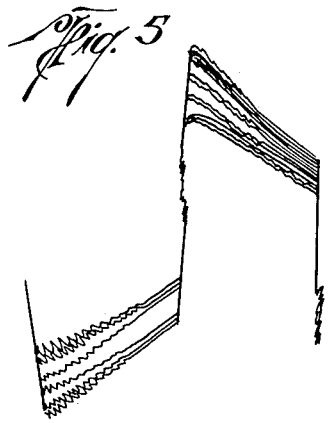
Figure 8:
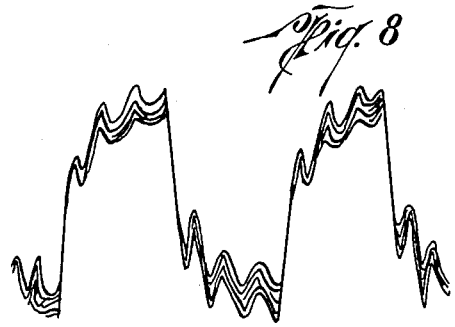
Figure 6:
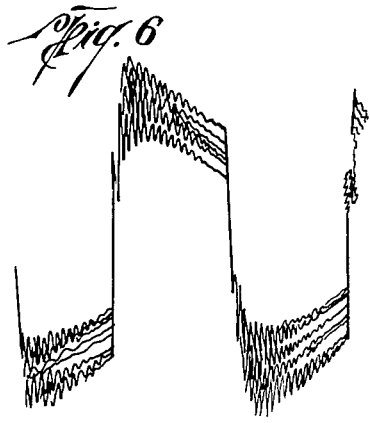
Figure 9:
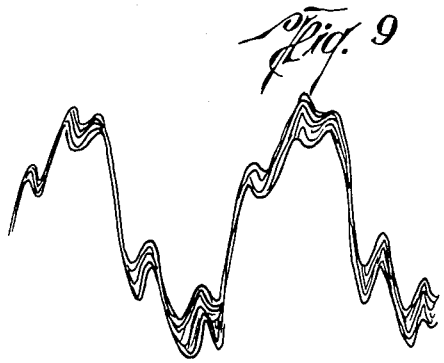

These energies in characteristic wave form produced by the apparatus of the invention, as seen on the oscilloscope during about one fiftieth of a second, are illustrated in FIGS. 4 to 9, inclusive. For convenience, the following wave forms are listed according to there fundamental frequencies, but include multiple harmonics and are modulated by alpha-beta waves of from about 9 to about 26 cycles per second. The wave illustrated in FIG. 4 is approximately 200 cycles per second, the wave form in FIG. 5 is approximately 400 cycles per second, the wave form in FIG. 6 is approximately 750 cycles per second, the wave form in FIG. 7 is approximately 1250 cycles per second, the wave form in FIG. 8 is approximately 2250 cycles, and the wave form illustrated in FIG. 9 is approximately 4000 cycles per second. These waves generally simulate the waves emitted by the central nervous system of human beings. It will be understood, of course, that other frequencies may be obtained, such as by changing the capacities at the six-pole switch 12; however, the wave forms illustrated in FIGS. 4–9, inclusive, have been satisfactory in use.

In general, the lower frequencies are used for moving heavy masses of muscles such as in paralysis, polio, leg and abdominal treatments. And the higher frequencies can be used for moving less heavy and lighter masses of muscles, such as, for example, the muscles about the faces and neck.

In operation, the switch 12 is adjusted for the desired frequency, ordinarily lower frequencies in moving heavy masses of muscles and higher frequencies for the lighter muscles. Anode potential is supplied to the plate circuits of the audio tube 11, the mixer tube 16, the pulse generator 23, the flexer tube 34, the amplifier tube 44, the push-pull amplifiers 49 and 50 and potential is fed to the center taps of the input 48 and output 51 transformers of the push-pull amplifier circuit. Potential is also supplied from the power circuit to the anode circuits of the surging tube 66 and the relay-actuating tube 68. Where the tubes are drawing current and the device is ready to give a treatment, the blinker circuit coupled to the anodes of these tubes begins functioning giving such an indication.

Assuming that tetanizing current without surging is to be used in the treatment, the ganged potentiometers 33 and 33a are adjusted to control the amplification of tubes 34 and 44, respectively. Switch 54 is placed in the middle position and switch 56 is placed in the extreme right-hand position and tetanizing current is fed to the jacks 57. In the event galvanic current is to be supplied, switches 54 and 56 are moved to the extreme left-hand positions which filters the audio through filter condenser 59 and rectified it at 55a. In the event faradic current is desired, switch 54 is placed in the middle position, switch 56 in left or outer position and an unfiltered, rectified current is fed to the jacks 57. Moving the switch 54 to the extreme right-hand position cuts out the volt meter 53 and closes the monitor speaker circuit 55.

If desired, surging of the current, either tetanizing, faradic or galvanic, may be accomplished manually by rotating ganged potentiometers 33 and 33a or automatically by closing switch 32 to bring in the urging circuit. The resistors 72 and 71 are adjusted to control the fall and rise, respectively, of the relay-actuating tube 68, and the speed of the make and break circuit F is adjusted by adjusting the variable resistor 41, the make and break circuit being brought in by closing switch 37 and 37a.

As indicated before, the make and break circuit F controls the amplification of tube 34, and the timing circuit E, which includes the tube 68, serves as a timer for timing the amplification rise and fall of the tube 66. Circuit F provides a sudden change of amplification for comparatively violent, yet painless contractions, while circuit E provides a smooth, gradual, clonic contraction and extension of the muscles. Thus, by closing switch 32, and adjusting the variable resistors 71 and 72, the pulse-modulated wave fed from the mixer circuit B to the flexer circuit D is surged, and thence is fed to the amplifier circuit G, push-pull amplifier H and output circuit H to the jacks I in the manner mentioned.

The treatment pads connected by the jacks 57 by which the waves are impressed on the nerves or affected areas of human beings may be of any desired type, although, sharp or small pointed electrodes are not as efficient as those having more surface inasmuch as the current is weakened by the small carrying capacity of the point and contraction of the muscles is not sufficiently definite or perceptible. Satisfactory treatment pads, however, may be made of fine pore photo plate wiping cellulose sponges, which have inserted therein a layer of expanded, copper braid, which is tin plated and to which is attached an end of a flexible insulated conductor, to the other end of which is fitted a suitable amphenol plug for insertion in the jacks 57. They may be of varying size to fit the needs or desires of the operator. In most instances, it is desirable to moisten the electrodes with a weak saline solution, say of the order of 2%, to provide a more efficient electrode.

The present apparatus and method have been successful in treating a wide variety of ailments, among which are the prevention and treatment of post operative abdominal adhesions. Also amenorrhea, arthritis and partial ankylosis, migraine, head colds, Parkinson's disease, acroparesthesia, bursitis, charleyhorse, constipation, colitis, prolapsed colon and female organs, fallen arches, neuritis, paralysis, rheumatism, sinus and hay fever, sciatica, wryneck, iontophoresis for arthritis, muscular atrophy, asthma, backache due to strain or overwork, bronchiectasis, poliomyelitis, Buerger's disease, bronchitis, bruises, deltoid bursitis, chilblains, constipation due to sigmoid distension, corneal ulcers, chronic deafness, Dupuytren's contraction, dysmenorrhea, endocervicitis, endometritis, headaches, hemorrhoids, acute and chronic lumbago, eyestrain, menorrhagia, neuralgia, peripheral facial paralysis, Bell's palsy, prostatic enlargement, ptosis of the abdomen, Raynaud's disease, relaxed vaginal walls, scar tissue, manic depressives, infantile uterus, prolapse of the uterus, visceroptosis, and others.

The above list of affections have been clinically improved or cleared up following the use of this modality by licensed physicians, and physiotherapists. It is not implied that all cases suffering from such affections would benefit from this type of electrical energy, nor that it is in any sense a cure-all.

In general, in using the apparatus of the invention, the neutral or indifferent pad (electrode to ground) may be placed at the upper or lower end of the spine, normally beginning at the sacrum, and the active pad (electrode supplied current) is placed on the nerve motor points controlling the area of pain or other trouble.

The following examples are given of various representative examples of treatments. Ordinarily, no two patients have identical tolerance, and it is necessary to gauge the treatment by the patient's reaction. In general, all parts or organs of the body are sensitive to the wave produced to a greater or lesser degree, and the wave sensibility may be affected by disease. Organs which are indurated or become affected by disease may be less sensitive to the waves than normal, just as they are less sensitive to any mechanical stimulation acting upon them. Susceptibility of different patients to the application of these waves to the surface of the body will vary greatly. Thus, the examples which follow are merely illustrative and a successful treatment for a particular patient may completely be outside the procedures specified. In the following examples, the switch 64 is adjusted to the patients' tolerance, and the positions given are typical. As the numbers increase, the power is weaker, and as the numbers decrease, the power is increased.

*Example I*

In preventing postoperative abdominal adhesions, satisfactory results are obtained by placing the indifferent electrode on the back and the active electrode over the area of adhesions, providing a surging, tetanizing wave to cause between about 10 to about 20 mild contractions per minute at first and gradually increasing as treatment progresses, the tetanizing current being at a frequency of about 2250 to about 4000 cycles per second. In the event the adhesions have formed, the indifferent electrode is placed on the back, and the active one over the scar and the apparatus is adjusted to cause about 20 to 30 mild contractions per minute. In this example, switch 64 is in position 3, which is the average position.

*Example II*

In the treatment of arthritis and partial ankylosis, electrodes are placed on each side of the joint, a tetanizing current is adjusted to a comfortable tolerance and may be of a frequency in the range of 200 to about 750 cycles per second with switch 64 in position 3. For an angle, one electrode may be placed under the foot and the other back of the leg and a tetanizing current provided sufficient to extend the foot 25 to 35 times per minute. After a short period of time, about five minutes, the pad on the back of the leg may be changed to the tibialis anticus and adjusted to about 25 to 35 surges per minute to contract the muscles. For a straight and stiff elbow, an electrode is placed on the back and at the insertion of the biceps. In a bent elbow, one electrode is placed over the upper dorsal region and the other is placed at the back of the elbow at the insertion of biceps, with 25 to 40 surges per minute being provided.

*Example III*

In the treatment of migraine, the indifferent pad is placed in the lumbar region and the active pad at the base of the skull with a frequency in the range of 2250 to about 4000 cycles per second. Preferably, the focal nerve points on the neck and face should be alternated for about 12 or 15 minutes and then the active pad moved over the medulla oblongata. In this treatment, switch 64 may be in position 4 or 5.

*Example IV*

In the treatment of head colds, the indifferent pad is placed at the back of the neck and the active pad on the focal nerve points of the face. The frequency may be in the range of about 2250 to about 4000 cycles per second with switch 64 in position 5.

*Example V*

For the treatment of Parkinson's disease, the indifferent pad may be placed at the lumbar region of the spine and the active pad at the back of the neck over the medulla oblongata. The frequency ranges from about 200 to about 400 cycles per second. The active pad may be alternated on the nerve points of the neck, face and shoulders for a short length of time, for example about two minutes, and the frequency ranges may be adjusted to about 400 to about 750 cycles per second and the nerve points followed over the entire body, preferably swelling the tetanizing current during the application. Switch 64 may be in position 2 or 3, except in facial areas position 4 (clockwise) may be used.

*Example VI*

For bursitis, the electrodes may be placed over the motor points in the area, one of the pair located indifferently. Preferably, there should be supplied a slow flexing current in the range of 1250 cycles per second with switch 64, position 3.

*Example VII*

For treatment of trigeminal neuralgia or Bell's palsy, the indifferent electrode should be applied directly over the occiput and the active electrode placed over the fifth cranial nerve in area of the temple followed by light massage with electrodes over all facial nerves. Both surge and constant current in the range of 2250 to 4000 cycles per second may be used for relief while the surge should predominate for relief in the range of 30 times per minute. In this treatment, switch 64 is in the position 5, which is the weakest power position.

*Example VIII*

In the treatment of sinus and hay fever, the indifferent electrode is placed at the base of the skull along the upper spine with the active pad around the sinus cavities, using as in a massage. Both surging and constant energy may be applied in the range of about 1250 to about 4000 cycles per second, and in surging and about 30 to 40 times per minute. As in Example VII, switch 64 is in position 5.

*Example IX*

In the treatment of asthma, to relieve spasms, a tetanizing current in the frequency range of about 200 to about 400 cycles per second is used and two active electrodes connected together, one placed over each lung, the inactive electrode being placed over the cervical vertebra. With emphysema, the same tetanizing current is applied to the upper dorsal and lower cervical region, one electrode being used alternately over each lung. Switch 64 is in position 2 or 3, which are stronger power positions.

*Example X*

In the treatment of bronchitis, subacute or chronic, the active electrode is placed on the back and a tetanizing current of the frequency of about 750 to about 1250 cycles per second is surged at about 20 times per minute, the inactive electrode being placed below the clavicle. Switch 64 may be in position 3.

*Example XI*

In the treatment of paralysis, for example when affecting the arm, place the indifferent electrode over the sixth to the eighth dorsal vertebra and an active electrode to the palm of the hand or wrist with a tetanizing current of about 200 to about 750 cycles per second. Surge about 15 to 20 surges per minute. When affecting the leg, the indifferent electrode may be placed in the lumbar region, and the active electrode on the ankle with tetanizing current and frequency and surge ranges the same as in treating the arm. In both treatments, the active electrode should be moved to all the nerve motor points of the affected area. As in Example XI, switch 64 is in position 2 or 3.

No more specific examples are given inasmuch as to do so would unduly extend the specification. The following placements, however, have been satisfactory, with the indifferent pad on the sacrum, place the active on the abdomen for female trouble (as derangements), colitis, constipation, tipped, collapsed or dropped uterus, and place the indifferent pad on coccyx for prostrate trouble. The active pad may be placed on the upper part of the leg (femoral) for knotted muscles, weak knees and athlete's foot, on the lower leg for deranged arch, foot and leg muscles, fallen arches, strained ligaments, ulcers or varicose veins resulting from impaired circulation. The active pad may be placed below the shoulder and chest for angina, bronchial congestion, inflammation of the thoracic or respiratory regions and congestion of these regions. The active pad may be placed on the back at the shoulder line (rear thoracic) for gall bladder, liver disorders, and nervous stomach treatment. The active pad may be placed on the lower back (sacroiliac) for kidney disorders, sciatica, lumbago, and inflammation of the lumbar regions or lower extremities. The active pad may be placed below the buttocks and below the arm pits to stimulate overall circulation and relax nervous tension of the body. Other placements, of course, may be made depending upon the condition of the patient and the treatment desired.

The apparatus and method may also be used as an aid to diagnosis, such as, determining the actual functional activity of individual or groups of muscles, degree of paralysis, reaction of degeneration and the like, and also in treating depressives, neuropsychiatrics, melancholias and the like.

Thus, the present invention includes means to electronically produce waves generally simulating those emitted from the nervous system of man, as seen on the electroencephalogram and oscilloscope, which broadly comprises a group of dissimilar wave-generating circuits run through a mixer, from which appears wave trains of multiple shape and frequency, with their pulses stretched in order to obtain greater treatment time per cycle and with double square waves, which in turn are modulated by pulsed waves of several shapes and frequencies, with a simultaneous amplitude pulse modulation causing the wave to have a constant dancing motion when viewed on the oscilloscope. The present invention also includes the method of applying low-voltage, simulated waves of the nervous system of human beings, as seen on the electroencephalogram and oscilloscope, to nerve motor points of human beings to correct neurological and neuromuscular troubles by reactivation or arousing latent motor neuron pools, motor sensory and autonomic nerves, mucles and blood vessels thereby aiding nature in effecting a cure or an improvement in condition.

In activating or stimulating any nerve, an increase of sodium inside the myelin sheath at dendrite, minute increase in the amount of potassium externally to the dendrite is provided which aids in the assimilation of food by the nerve cell, thus aiding or increasing metabolism or cell growth and simultaneously causing a minute increase in acetycholin around the myelin sheath which is hydrolyzed by the cholinesterase at the neuromuscular junction. This hydrolysis aids in the mediation of the wave current. The hydrolysis of the acetycholin by the cholinesterase aids in synapse transmission and increases electrotonus which is the spreading of the wave from nerve to nerve by an apparent change in impedance of the nerve fibers. Thus, the method and apparatus may be used to reactivate nerve cells where the reaction of degeneration has occurred.

The present method and apparatus are useful in causing vasodilation and vasoconstriction to relieve congestion or thrombosis.

The present method and apparatus, therefore, are well-suited to fulfill the objects set forth and attain the advantages mentioned as well as others incidental thereto and inherent therein. It is understood that while detailed examples of the apparatus and method of the invention have been given for the purpose of disclosure, many changes in details and arrangements of parts will readily suggest themselves to those skilled in the art, which are encompassed in the spirit of the invention and the scope of the appended claims.

What is claimed is:

1. Apparatus for producing wave trains resembling those of the central nervous system of human beings, as seen on the oscilliscope, comprising, an audiofrequency oscillator system having an output circuit, a pulse generator having an output system and generating alpha-beta waves, and a modulator system connected to the output circuits of said audiofrequency oscillator system and said pulse generator for modulating the waves of said audiofrequency oscillator system with those of said pulse generator, said modulator system having an output circuit whereby said modulated waves may be impressed on one or more nerves, muscles or blood vessels of said human beings.

2. Apparatus for producing wave trains resembling those of the central nervous system of human beings, as seen on the oscilliscope comprising, a first oscillator system having an output circuit, means included in said first oscillator system for adjusting the frequency thereof from about 200 to about 4,000 cycles per second, a second oscillator system having an output circuit, said second oscillator system having a frequency in the range from about 9 to about 26 cycles per second, and a modulator system connected to the output circuits of said first and second oscillators for modulating the waves of said first system with those of the second system, said modulator system having an output circuit whereby said modulated waves may be impressed on one or more nerves, muscles or bloods vessels of said human beings.

3. Apparatus for producing wave trains resembling those of the central nervous system of human beings, as seen on the oscilliscope, comprising, a first oscillator system having an output circuit, said oscillator system producing square waves in the audiofrequency range, a second oscillator system having a frequency range of about 9 to about 26 cycles per second and having an output circuit, and a cathode follower oscillator having a grid circuit, both said output circuits connected to said grid circuit for modulating the waves of said first oscillator system with those of said second oscillator system thereby producing said wave trains resembling those of the central nervous system of human beings, as seen on the electroencephalogram, said cathode follower oscillator having an output circuit including means to impress said modulated waves on one or more nerves, muscles or blood vessels of said human beings.

4. Apparatus for producing wave trains resembling those of the central nervous system of human beings, as seen on the oscilloscope, comprising, a first oscillator system having an output circuit and including means for adjusting the frequency thereof from about 200 to about 4,000 cycles per second, a cathode follower oscillator system having a grid circuit connected to the output of said first oscillator system, and a second oscillator system connected to the grid circuit of said cathode follower oscillator system, said second system having a frequency of about 9 to 26 cycles per second, said cathode follower oscillator circuit modulating waves of said first circuit with those of said second circuit and including an outlet circuit, and means in the output circuit for changing said modulated waves from a low impedance to a high impedance for impressing high impedance modulated waves on one or more nerves, muscles or blood vessels of said human beings.

5. Apparatus for producing wave trains resembling those of the central nervous system of human beings, as seen on the oscilloscope, comprising, an audio-oscillator having an output circuit, a pulse generator having an output circuit and generating alpha-beta waves, a cathode follower oscillator connected to the output circuits of said audio-oscillator and said pulse generator, said cathode follower oscillator having an output circuit, said cathode follower oscillator modulating waves of said audio-oscillator with those of said pulse generator, means in the output circuit of said cathode follower oscillator for changing the modulated wave from low to high impedance, and means included in the output circuit of said cathode follower oscillator for amplifying said high-impedance modulated wave for impressing on nerves, muscles or blood vessels of said human beings.

6. Apparatus for producing wave trains resembling those of the central nervous system of human beings, as seen on the oscilloscope, comprising, an audio-oscillator having an output circuit, a pulse generator having an output circuit and generating alpha-beta waves, a cathode follower oscillator connected to the output circuits of said audio-oscillator and said pulse generator, said cathode follower oscillator having an output circuit, said cathode follower oscillator modulating waves of said audio-oscillator with those of said pulse generator, means in the output circuit of said cathode follower oscillator for changing the modulated wave from low to high impedance, and a push-pull amplifier included in the output circuit of said cathode follower oscillator for amplifying said high-impedance modulated wave for impressing on nerves, muscles or blood vessels of said human beings.

7. Apparatus for producing wave trains resembling those of the central nervous system of human beings, as seen on the oscilloscope, comprising, an audio-oscillator having an output circuit, a pulse generator having an output circuit and generating alpha-beta waves, and a cathode follower oscillator connected to the output circuits of said audio-oscillator and said pulse generator for modulating the waves of said audio-oscillator with those of said pulse generator, said cathode follower oscillator having an output circuit including means to change the modulated wave from a low to a high impedance, and including means for surging said high impedance modulated waves for impressing such surged waves on nerves, muscles or blood vessels of said human beings.

8. Apparatus for producing wave trains resembling those of the central nervous system of human beings, as seen on the oscilloscope, comprising, an audio-oscillator system including a twin triode having an output circuit and a grid circuit free of resistors, a pulse generator having an output circuit and generating alpha-beta waves, said pulse generator including a twin triode, a cathode follower oscillator system including a twin triode and a grid circuit, the output circuits of said audio-oscillator system and said pulse generator being connected to the grid circuit of said cathode follower oscillator system whereby waves of said audio-oscillator system are modulated by waves from said pulse generator, said cathode follower oscillator system having an output circuit including means for changing the modulated wave from low impedance to high impedance, and amplifier means connected in the output circuit of said cathode follower oscillator system including a push-pull amplifier.

9. Apparatus for producing wave trains resembling those of the central nervous system of human beings, as seen on the oscilloscope, comprising, an audio-oscillator including a twin triode, the grids of which are free of resistors, a pulse generator generating alpha-beta waves, a cathode follower oscillator having a grid circuit and an output circuit, said audio-oscillator and said pulse generator having output circuits connected to the grid circuit of said cathode follower oscillator whereby waves of said audio-oscillator are modulated by waves of said pulse generator in said grid circuit, a bridge in the output circuit of said cathode follower oscillator for changing said modulated waves from low to high impedance, a flexer system in said last-mentioned output circuit, said flexer system including a twin triode having an output circuit and an automatic grounding device connected to the output of the triodes of said flexer system effectively controlling the amplification thereof, an amplifier circuit connected to the output circuit of the triode of said flexer system, said amplifier circuit effectively amplifying the high impedance modulated wave of the output circuit of the triodes of the flexer system, an electronic push-pull amplifier inductively coupled in said amplifier circuit, said push-pull amplifier inductively coupled to an additional output circuit for impressing said amplified and modulated waves on nerves, muscles or blood vessels of said human beings.

10. The apparatus of claim 6 including a pulsing oscillator system, a relay system effectively controlling the amplification of said pulsing oscillator system, said relay system including an amplifier, variable resistors controlling the rise and fall of amplification of said amplifier for controlling the actuation of said relay, and switch means for connecting said pulsing system in the output circuit of said cathode follower oscillator system.

11. Apparatus for producing wave trains resembling waves of the central nervous system of human beings, as seen on the oscilliscope comprising, an audio-oscillator having an output circuit, said oscillator including means to adjust the frequency thereof, said audio-oscillator including a twin triode, the grids of which are free of resistors, a cathode follower mixer having a grid circuit and an output circuit, a pulse generator having an output circuit and generating alpha-beta waves, the output circuits of said audio-oscillator and said pulse generator being connected to the grid circuit of said cathode-follower mixer whereby waves of said audio-oscillator are modulated by waves of said pulse generator in said grid circuit, a bridge in the output circuit of the cathode-follower mixer changing the modulated waves from low to high impedance, a flexer amplifier having an input circuit adjustably connected to the output circuit of said cathode-follower oscillator, said flexer amplifier including a twin triode having an output circuit and automatic grounding device effectively controlling the amplification of the twin triode thereof, an electron amplifier adjustably connected to the output circuit of the twin triode of said flexer amplifier, a push-pull amplifier inductively coupled to the output of said electron amplifier, an additional output circuit inductively coupled to the output of said push-pull amplifier, said last-mentioned output circuit including indicating means, an automatic surging circuit including a pentode and a relay actuating circuit controlling the amplification of the pentode, said relay-actuating mechanism including a relay, a pentode effectively actuating said relay and including adjustable means for adjusting the amplification of said last-mentioned pentode, switch means in the output circuit of said cathode follower oscillator for connecting said automatic surging circuit, and a source of current adapted to energize said audio-oscillator, cathode-follower mixer, alpha-beta oscillator, flexer amplifier, electron amplifier, push-pull amplifier, automatic surging circuit and said output circuit.

12. The apparatus of claim 11 including filter means and rectifying means in the additional output circuit to filter and rectify the output thereof, and including switch means to connect said filter and rectifying means in said additional output circuit thereby providing galvanic current with reversible polarity.

13. The apparatus of claim 11 including a rectifier in the additional output circuit and switch means for connecting said rectifier in said additional output circuit for rectifying the output thereof thereby providing faradic current with reversible polarity.

14. A method of activating one or more nerves of human beings comprising applying to said nerves at low voltage an electrical wave simulating the pattern of the alpha-beta rhythm and the basic wave characteristics of the central nervous system of normal human beings as seen on the oscilloscope.

15. A method of activating one or more nerves of human beings comprising electronically generating a wave simulating the pattern of the alpha-beta rhythm and the basic wave characteristics of the central nervous system of normal human beings as seen on the oscilloscope, and impressing said wave at low voltage on the one or more nerves.

16. A method of activating one or more nerves of human beings comprising applying to said one or more nerves at low voltage a wave train resembling the pattern of the alpha-beta rhythm and the basic wave characteristics of the central nervous system of normal human beings as seen on the oscilloscope.

17. A method of activating one or more nerves of human beings comprising electronically generating a wave train generally simulating the pattern of the alpha-beta rhythm and the basic wave characteristics of the central nervous system of normal human beings as seen on the oscilloscope, and impressing such wave train at low voltage on the one or more nerves.

18. A method of activating latent motor neurone pools, motor sensory and autonomic nerves of human beings comprising, electronically generating a wave form simulating the pattern of the alpha-beta rhythm and the basic wave characteristics of the central nervous system of normal human beings as seen on the oscilloscope, and impressing said wave form at low voltage on areas of said human beings.

19. A method of activating one or more innervated muscles of human beings comprising, electronically generating a wave form simulating the pattern of the alpha-beta rhythm and the basic wave characteristics of the central nervous system of normal human beings as seen on the oscilloscope, and impressing said wave form at low voltage on said one or more muscles.

20. A method of vasodilation comprising, electronically generating a wave form simulating the pattern of the alpha-beta rhythm and the basic wave characteristics of the central nervous system of normal human beings as seen on the oscilloscope, and impressing said wave form at low voltage to congested areas of said human beings.

21. A method of activating one or more nerves of human beings comprising impressing at low voltage on said one or more nerves a wave comprised of a train of square waves in the audio frequency range modulated with alpha-beta waves.

22. A method of activating one or more nerves of human beings comprising impressing on said nerves at low voltage a wave comprised of electronically generated square waves of the range of about 200 to about 400 cycles per second modulated with alpha-beta waves in the range of about 9 to about 26 cycles per second, said wave generally resembling waves having the alpha-beta rhythm and the basic wave characteristics of the central nervous system of normal human beings.

23. A method of activating one or more nerves of human beings comprising impressing on said nerves at low voltage an amplified wave comprised of square waves of extended width in the range of about 200 to about 4,000 cycles per second modulated with electrically produced waves in the range of about 9 to about 26 cycles per second.

24. A method of electronically activating one or more nerves of human beings comprising impressing at low voltage on said one or more nerves a wave comprised of square waves in the audio frequency range modulated with alpha-beta waves, and surging said waves.

25. A method of activating one or more nerves of human beings comprising, impressing at low voltage on said one or more nerves waves comprised of electronically generated square waves of extended width in the range of from about 200 to about 4,000 cycles per second modulated with waves in the range of about 9 to about 26 cycles per second, and surging said waves.

26. A method of activating nerves of human beings comprising impressing at a voltage of less than 5 volts an amplified wave comprised of electronically generated square waves of extended width in the range of about 200 to about 4,000 cycles per second modulated with electronically produced waves in the range of about 9 to about 26 cycles per second, and surging said amplified waves from about five to about one hundred seventy surges per minute.

27. Apparatus for producing wave trains resembling those of the central nervous system of human beings, as seen on an oscilloscope, comprising, an audio frequency oscillator circuit having an output circuit, said oscillator circuit including dual triode circuits, a cathode, grid and plate in each of the dual triode circuits, a pair of capacitors, the grids of each triode circuit connected through one of the capacitors to the plate of the other triode circuit, said grid circuits being free of grid bias resistors thereby producing a square wave pattern of multiple harmonics with varying phase relationships; a pulse generator having an output circuit, said pulse generator including dual triode circuits arranged to produce waves varying in amplitude and varying in frequency from 9 to 26 cycles per second; a cathode follower including dual triode circuits having grid circuits, the output circuits of the audio frequency oscillator and the pulse generator being connected to a grid of one of said cathode follower triode circuits thereby modulating the output of the audio oscillator and the pulse generator on said grid circuit, an output circuit electrically connected to said cathode follower; and means in said cathode follower output circuit for impressing said output on nerves, muscles or blood vessels of said human beings.

28. The apparatus of claim 27 including a voltage supply means connected to the triode plate circuits of the audio frequency oscillator, the pulsen generator, and the cathode follower.

29. The apparatus of claim 27 in which the output circuit of the cathode follower includes a high impedance bridge and amplification means.

30. The apparatus of claim 27 in which one of the triode circuits of the pulse generator includes phase shifting means.

31. The apparatus of claim 30 in which the phase shifting means includes an R.C. phase shift bridge.

32. Apparatus for producing wave trains resembling those of the central nervous system of human beings, as seen on an oscilloscope, comprising, an audio frequency oscillator, circuit means connected to said oscillator for varying the frequency thereof, said circuit means including a dual triode circuit, a cathode, grid and plate in each triode circuit, a capacitor connected between the grids of each triode and the plate of the other triode circuit, said grid circuits being free of grid bias resistors, an oscillator output circuit connected to the oscillator and arranged to produce a square wave pattern of multiple harmonics with varying phase relationships; a pulse generator including dual triode circuits, phase shaft means connected in one of the pulse generator triode circuits, an output circuit electrically connected to said pulse generator arranged to produce waves varying in amplitude and varying in frequency from 9 to 26 cycles per second; a cathode follower circuit including dual triode circuits each having a grid circuit, said cathode follower grid circuits connected to the output circuit of the audio frequency oscillator, one of the cathode follower grid circuits connected to the output circuit of the pulse generator thereby modulating the output of the audio frequency oscillator and the pulse generator on said grid circuit thereby producing wave trains resembling those of the central nervous system of human beings, an output circuit connected to the cathode follower circuit; an amplifier circuit including an output circuit; an automatic surging circuit connected between the cathode follower output circuit and the amplifier circuit thereby automatically varying the amplification; and means included in the output circuit of the amplifier circuit for impressing the modulated output waves on nerves, muscles or blood vessels of said human beings.

33. The apparatus of claim 32 including a power supply adapted to start the audio frequency oscillator.

34. The apparatus of claim 32 in which the output circuit of the cathode follower includes a high impedance bridge.

35. The apparatus of claim 32 including an automatic grounding circuit connected to the amplifier circuit thereby suddenly changing the amplification and producing pulsed waves.

36. The apparatus of claim 32 including filter means and rectifying means in the amplifier output circuit to filter and rectify the output thereof, and including reversible switch means to connect said filter means and rectifying means in the output circuit thereby providing galvanic current with reversible polarity.

37. The apparatus of claim 32 including a rectifier in the amplifier output circuit and switch means for connecting said rectifier in said circuit thereby rectifying the output thereof and providing faradic current with reversible polarity.

References Cited in the file of this patent

UNITED STATES PATENTS

| | | |
|---|---|---|
| 2,218,701 | Dewar | Oct. 22, 1940 |
| 2,295,585 | Lindquist | Sept. 15, 1942 |
| 2,350,797 | Morland et al. | June 6, 1944 |
| 2,498,882 | Fizzell et al. | Feb. 28, 1950 |
| 2,532,788 | Sarnoff | Dec. 5, 1950 |
| 2,590,216 | Schuhfried | Mar. 25, 1952 |

FOREIGN PATENTS

| | | |
|---|---|---|
| 387,518 | Great Britain | Feb. 9, 1933 |

OTHER REFERENCES

Wireless World for April 1949, pp. 129–132.

Macleod's Physiology, a book published by C. V. Mosby Co., St. Louis, Mo., 1938, p. 193. Copies in Scientific Library.